United States Patent [19]
Grau et al.

[11] Patent Number: 5,818,906
[45] Date of Patent: Oct. 6, 1998

[54] CONNECTION EVENT REPORTING IN A CABLE TELEPHONY SYSTEM

[75] Inventors: Alan L. Grau, Bloomingdale; Dawn M. Galecki, Barrington; Kurt Steinbrenner, Bartlett, all of Ill.

[73] Assignee: Motorola Inc., Schaumburg, Ill.

[21] Appl. No.: 614,560

[22] Filed: Jul. 2, 1996

[51] Int. Cl.[6] .............................. H04M 1/24; H04H 7/14; H04H 17/00

[52] U.S. Cl. .................................. 379/34; 379/1; 379/13; 379/113; 455/5.1; 455/6.3; 348/13; 348/180

[58] Field of Search .................... 379/111, 112, 379/113, 133, 134, 135, 136, 9–15, 1, 34; 348/1, 2, 3, 6–16, 180; 455/3.1, 2, 5.1, 6.1, 6.3

[56] References Cited

U.S. PATENT DOCUMENTS

| 5,367,329 | 11/1994 | Nakagaki et al. | 348/1 |
|---|---|---|---|
| 5,438,356 | 8/1995 | Ushiki et al. | 348/12 |
| 5,473,679 | 12/1995 | La Porta et al. | 348/12 |
| 5,487,066 | 1/1996 | McNamara et al. | |
| 5,583,927 | 12/1996 | Ely et al. | 348/16 |

OTHER PUBLICATIONS

U.S. Patent Application 08/564,983, filed Nov. 29, 1995 by Corrigan, R. et. al. "Method and Apparatus for Assigning Communications Channels In a Cable Telephony System".

U.S. Patent Application 08/564,606, filed Nov. 29, 1995 by Burke, T. et. al., "Method and Apparatus for Synchronizing Timing of Components of a Telecommunication System".

*Primary Examiner*—Paul Loomis
*Attorney, Agent, or Firm*—Aaron B. Bernstein

[57] ABSTRACT

A cable telephony system (100) including a plurality of subscriber units (142) connected to a cable control unit (102) by a cable distribution network (106) in which the cable control unit (102) detects events associated with connections occurring in the cable telephony system. Information describing these events is placed into connection event reports and sent to a traffic analysis and planning system (116) as the events are detected by the cable control unit (102). These reports are used to manage the cable telephony system (100).

26 Claims, 13 Drawing Sheets

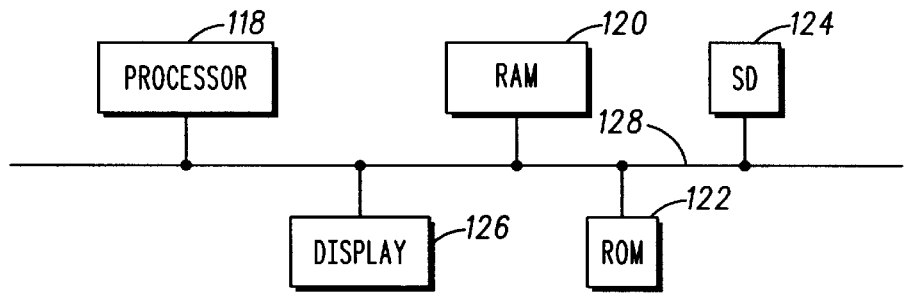

FIG.2

200
CONNECTION EVENT MESSAGE TYPES

| NAME |
| --- |
| CABLE_CONN_ESTABLISHED |
| NETWORK_CONN_ESTABLISHED |
| CALL_STABLE |
| REG_SUMMARY |
| CAU_INIT_REG |
| CCU_INIT_REG |
| LINK_TRANSFER |
| CONN_RELEADSED |
| CONN_FAILED |
| ABANDONED_CALL_REPORT |
| DOWNLOAD_REPORT |

REGISTRATION:
  CCU_INIT_REG OR CAU_INT_REG
  CABLE_CONN_ESTABLISHED
  REG_SUMMARY
  CONN_RELEASED
  LINK_TRANSFER

CALLS:
  CABLE_CONNECTION_ESTABLISHED
  NETWORK_CONNECTION_ESTABLISHED
  CALL_STABLE
  CONN_RELEASED
  LINK_TRANSFER

CONNECTION TEST:
  CABLE_CONNECTION_ESTABLISHED
  ABANDONED_CALL_REPORT
  CONN_RELEASED
  LINK_TRANSFER

CODE_DOWNLOAD:
  CABLE_CONNECTION_ESTABLISHED
  DOWNLOAD_REPORT
  CONN_RELEASED
  LINK_TRANSFER

| INFORMATION NAME |
| --- |
| CONNECTION IDENTIFIER |
| SEQUENCE NUMBER |
| TIMESTAMP |
| SERVING AREA IDENTIFER |
| TERMINAL IDENTIFIER(TID) |
| CABLE CARRIER PROFILE |
| CONNECTION TYPE |
| NETWORK CARRIER PROFILE |
| ALERT IDENTIFIER |
| REGISTRATION TYPE |
| NUMBER OF LINK TRANSFERS |
| ENCRYPITION KEY UPDATED |
| LINK TRANSFER STATUS |
| LINK TRANSFER TYPE |
| DISCONNECTION DISPOSITION |
| CALL SETUP DELAY |
| DIAL TONE |
| ABANDON CALL |
| VERSION NUMBER |
| DOWNLOAD STATUS |

FIG.6 — CABLE_CONN_ESTABLISHED (204)

| INFORMATION ELEMENTS |
| --- |
| MESSAGE TYPES |
| CONNECTION ID |
| SEQUENCE NUMBER |
| TIMESTAMP |
| SERVING AREA ID |
| TERMINAL ID |
| CABLE CARRIER PROFILE |

FIG.7 — NETWORK_CONN_ESTABLISHED (206)

| INFORMATION ELEMENTS |
| --- |
| MESSAGE TYPES |
| CONNECTION ID |
| SEQUENCE NUMBER |
| TIMESTAMP |
| SERVING AREA ID |
| TERMINAL ID |
| NETWORK CARRIER PROFILE |
| ALERT ID |
| CALL SETUP DELAY |
| DIAL TONE DELAY |

FIG.8 — CALL_STABLE (208)

| INFORMATION ELEMENTS |
| --- |
| MESSAGE TYPES |
| CONNECTION ID |
| SEQUENCE NUMBER |
| TIMESTAMP |
| SERVING AREA ID |
| TERMINAL ID |
| CONNECTION TYPE |

FIG.9 — REG-SUMMARY (210)

| INFORMATION ELEMENTS |
| --- |
| MESSAGE TYPES |
| CONNECTION ID |
| SEQUENCE NUMBER |
| TIMESTAMP |
| SERVING AREA ID |
| TERMINAL ID |
| REGISTRATION TYPE |
| TRAFFIC KEY UPDATED |

FIG. 10 — CAU INIT REG (212)
INFORMATION ELEMENTS
- MESSAGE TYPES
- CONNECTION ID
- SEQUENCE NUMBER
- TIMESTAMP
- SERVING AREA ID
- TERMINAL ID
- CABLE CARRIER PROFILE
- ALERT IDENTIFIER

FIG. 11 — CCU INIT REG (214)
INFORMATION ELEMENTS
- MESSAGE TYPES
- CONNECTION ID
- SEQUENCE NUMBER
- TIMESTAMP
- SERVING AREA ID
- TERMINAL ID
- ALERT ID

FIG. 12 — LINK TRANSFER (216)
INFORMATION ELEMENTS
- MESSAGE TYPES
- CONNECTION ID
- SEQUENCE NUMBER
- TIMESTAMP
- SERVING AREA ID
- TERMINAL ID
- CABLE CARRIER PROFILE
- LINK TRANSFER STATUS
- LINK TRANSFER TYPE

FIG. 13 — CONN RELEASED (218)
INFORMATION ELEMENTS
- MESSAGE TYPES
- CONNECTION ID
- SEQUENCE NUMBER
- TIMESTAMP
- SERVING AREA ID
- TERMINAL ID
- NUMBER OF LINK TRANSFER
- DISCONNECTION DISPOSITION

FIG. 14 — CONN FAILED (220)
INFORMATION ELEMENTS
- MESSAGE TYPES
- CONNECTION ID
- SEQUENCE NUMBER
- TIMESTAMP
- SERVING AREA ID
- TERMINAL ID
- CONNECTION TYPE
- DISCONNECTION DISPOSITION

FIG. 15 — ABANDONED_CALL_REPORT (222)
INFORMATION ELEMENTS
- MESSAGE TYPES
- CONNECTION ID
- SEQUENCE NUMBER
- TIMESTAMP
- SERVING AREA ID
- TERMINAL ID
- ABANDON CALL

FIG. 16 — DOWNLOAD_REPORT (224)
INFORMATION ELEMENTS
- MESSAGE TYPES
- CONNECTION ID
- SEQUENCE NUMBER
- TIMESTAMP
- SERVING AREA ID
- TERMINAL ID
- VERSION NUMBER
- DOWNLOAD STATUS

CONN_FAILED

| EVENT TYPE: | <EVENT TYPE> | CONNECTION ID: | <connection Id> |
|---|---|---|---|
| SEQUENCE NUMBER: | <SEQUENCE NUMBER> | TIME OF EVENT: | <TIMESTAMP> |
| SERVING AREA ID: | <serving area id> | TERMINAL ID: | <terminal id> |
| CONNECTION TYPE: | <connection type> | DISCONNECTION DISPOSITION: | <disconnection disposition> |

CONNECTION EVENT REPORTING IN A CABLE TELEPHONY SYSTEM

BACKGROUND

The present invention relates generally to a communications system and in particular, to a method and apparatus for reporting events in a cable telephony system. Still more particularly, the present invention is directed towards a method and apparatus for detecting events occurring within a cable telephony system and for managing the cable telephony system based on the reported events.

Communications systems, such as cable telephony systems provide telephony service to a number of users by utilizing shared resources. Network planning for such systems typically consists of determining the optimal amounts and configuration of resources to support the users of the communications system.

In existing cellular telephony systems, standard public switch telephony networks, and radio communications systems, a detailed log of each call can be obtained in which the log contains information specific to the type of system. This log is typically used for billing purposes, and the log is obtained after a period of time or after the call has ended. The present system for collecting records of calls, however, does not provide information in the manner necessary for network planning, nor does it provide information relating to cable systems. These systems utilize a separate additional method of reporting counts of events and resource utilization statistics for network planning. Therefore, it would be advantageous to have an improved method and apparatus for detecting events within a cable telephony system. It also would be advantageous to have a method and apparatus for managing the cable telephony system in response to the detected events.

BRIEF DESCRIPTION OF THE DRAWINGS

FIG. 2 is a block diagram of a data processing system in which the present invention may be implemented;

FIG. 3 depicts a block diagram of connection event message types according to the present invention;

FIG. 4 depicts a table of connection event messages for different types of activities in a cable telephony system according to the present invention;

FIG. 5 depicts a table of information elements that may be contained within a connection event message according to the present invention;

FIG. 6 depicts a table of information elements contained within a cable connection established message according to the present invention;

FIG. 7 depicts a table of information elements contained within a network connection established message according to the present invention;

FIG. 8 illustrates a connection event message sent in response to a call reaching a stable state according to the present invention;

FIG. 9 depicts a table of information elements in a registration summary message according to the present invention;

FIG. 10 is a table of information elements in a cable access unit (CAU) initiated registration message according to the present invention;

FIG. 11 is a table of information elements in a cable control unit (CCU) initiated registration message according to the present invention;

FIG. 12 depicts an illustration of a table of information elements for a link transfer message according to the present invention; FIG. 13 depicts a table listing information elements for a connection released message according to the present invention;

FIG. 14 illustrates a table of information elements in a connection failed message according to the present invention;

FIG. 15 depicts a table illustrating information elements in an abandoned call report message according to the present invention;

FIG. 16 depicts a table of information elements in a download report message according to the present invention.;

DETAILED DESCRIPTION OF A PREFERRED EMBODIMENT

The present invention provides a method and apparatus for supplying information regarding traffic load supported by the communications system and for managing the communications system. Both telephony and cable specific information regarding traffic loads supported by the communications system and the characteristics of this load, including, for example, peak usage times, peak call load, and other telephony data, as well as cable specific information, such as cable interference occurrences, cable carrier utilization, and system channel utilization are recorded by the method and apparatus of the present invention. Such information provides an ability to browse through the history of connection events in the system. The present invention provides an ability to both display events in real-time and provide a history of connection events occurring within the communications system. Additionally, statistical reports and other summary reports may be generated from history logs gathered by the present invention. According to the present invention, these features are provided by detecting events associated with connections occurring within the communications system, forwarding messages describing these events to the traffic analysis and network planning system, storing these messages as they are received, and displaying selected events as they are received at the traffic analysis and network planning system. The communications system is managed by monitoring the events as they occur and by analyzing the stored events. In particular, additions, changes, and reallocations of resources are efficiently made using these detected events.

According to the present invention, events are recorded as they occur to allow quick response to events as they occur and provide information for communications system debugging and error isolation. The method records information for all connections within the communications system including, for example, calls, connection tests, registrations, and code downloads.

Environment

Figure 1:
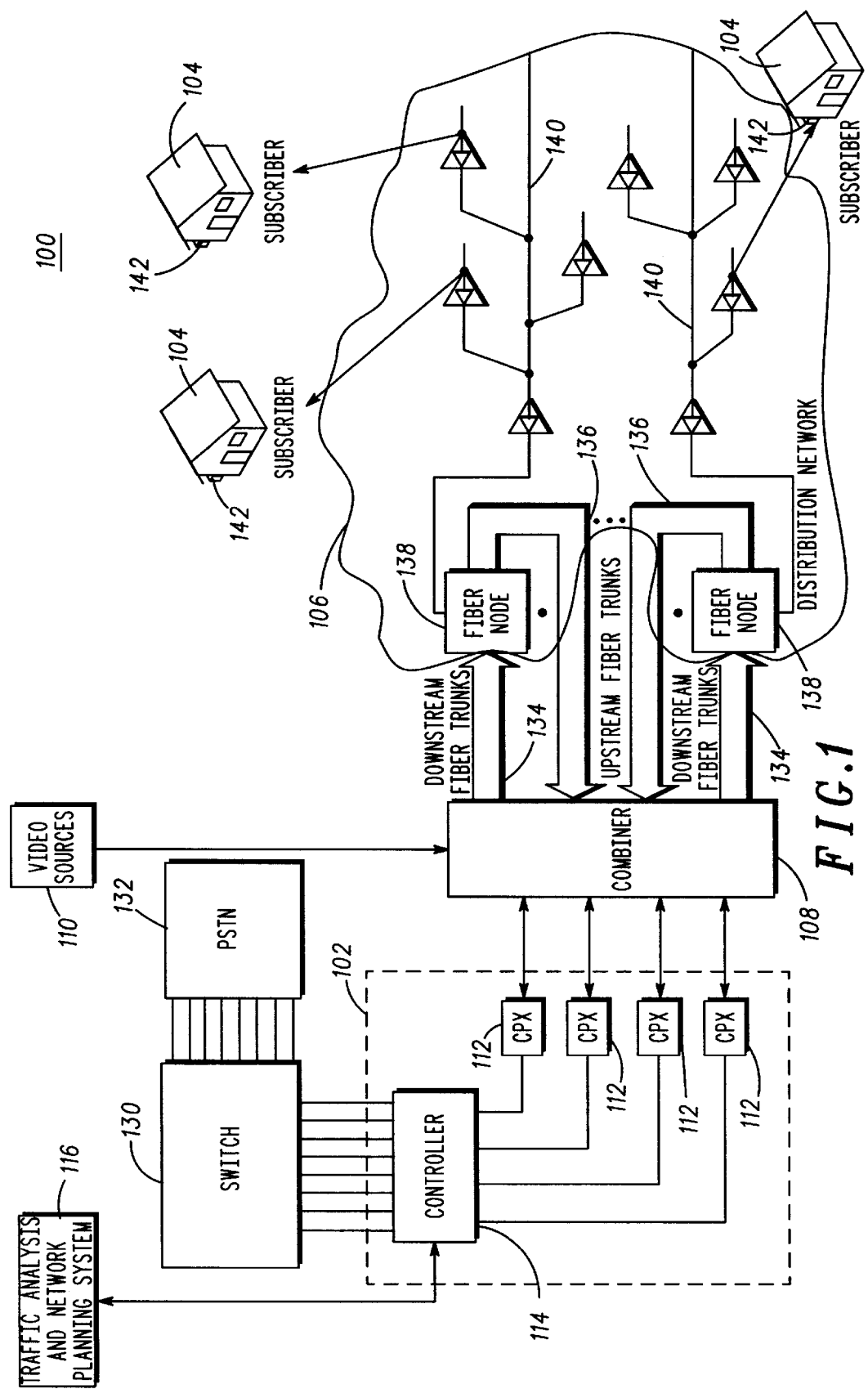
FIG. 1 illustrates a block diagram of a communications system according to the present invention.

With reference now to the figures, and in particular with reference to FIG. 1, a block diagram of a communications system 100 is illustrated in which the present invention may be implemented. In the depicted example, communications system 100 is a cable telephony system that includes a hybrid cable architecture using a combination of fiber and coaxial cable to distribute subscriber services to customer premises equipment. Alternatively, communications system 100 may consist entirely of coaxial cable, or other suitable medium. Regardless of the cable infrastructure, a cable branch will serve a distribution area servicing a community of subscribers. In the depicted example, communications system 100 provides telephone services along with cable television services on a hybrid fiber-coaxial cable television structure.

Communications system 100 includes a cable control unit (CCU) 102 or some other base communications unit that is connected to subscribers 104 by a cable distribution network 106 and a combiner 108. Combiner 108 provides an input for video sources 110. CCU 102 also includes cable port transceivers (CPXs) 112, which are connected to combiner 108. These CPXs generate downstream carrier channels in communications system 100. CPXs 112 are controlled by a controller 114, which provides all the functions necessary to support the data link portion of the system. Controller 114 also has a connection to traffic analysis and network planning system (TANPS) 116. TANPS 116 is a data processing system that may include a number of components as illustrated in FIG. 2, such as processor 118, random access memory (RAM) 120, read only memory (ROM) 122, storage device (SD) 124, and display 126 all connected by bus 128. TANPS 116 may be implemented using a number of data processing systems, such as a personal computer, a work station, or a mainframe computer system. Controller 114 also may be implemented using a data processing system as depicted in FIG. 2. Controller 114, however, typically would not include storage device 124 and display 126 according to the present invention. Controller 114 is typically implemented on a card located within CCU 102. Controller 114 is connected to a switch 130, which is in turn connected to a public switching telephone network (PSTN) 132. Switch 130 may be, for example, a class 5 TELCO switch.

Transmissions from CCU 102 and distribution network 106 are facilitated by downstream fiber trunks 134 and upstream fiber trunks 136. These fiber trunks are fiber-optic cables and are connected to fiber nodes 138. Each fiber node 138 has a connection to at least one cable branch 140, which are connected to cable access units (CAUs) 142. These CAUs are also called "communications units" or "subscriber units". Each cable branch 140 is divided into one or more serving areas, where a serving area consists of a set of resources shared by the CAUs assigned to that serving area.

The preferred system is a Time Division Multiple Access (TDMA) system. Cable access units, such as CAUs 142, scan the downstream channels to acquire frame synchronization with a system broadcast channel (SBC). The SBC occupies a time slot in one of the channels in each cable branch of the cable communications system. Frame synchronization is acquired by means of a known digital correlation process. The system access channel (SAC) and a traffic channel (TCH) also are used in time slots. SACs are used for requesting access to the network and for making TCH assignments. Suitable methods for time synchronization, and use of SBCs, SACs and TCHs are described in copending U.S. patent application Ser. Nos. 08/564,606 and 08/564,983, respectively, which are incorporated here by this reference.

CCU 102 is used to provide telephony, integrated services digital network (ISDN) services, digital video, interactive video, or interactive multimedia in communications system 100. Additionally, CCU 102 controls the cable spectrum for carriers carrying communications signals, infrastructure resources, and services for all CAUs in a serving area, as well as managing multiple serving areas. CCU 102 monitors messages within communications system 100 with respect to connections occurring within communications system 100. A "connection" is a communications link between two communications units, such as, for example, a CCU and a CAU over which messages can be sent from the CCU to the CAU and from the CAU to the CCU. CAUs 142 provide telephone, ISDN, digital video, interactive video, interactive multimedia, and television services at subscriber premises. The present invention provides a method and apparatus for determining the optimal amount and configuration of resources to support users in a communications system.

According to the present invention, the cable telephony communications system divides up the radio frequency (RF) spectrum for use with multiple subscribers such that no individual subscriber has a dedicated frequency range. The spectrum allocated for service within a single cable branch may be used again for a different group of subscribers in every cable branch of distribution network 106. A different portion of the spectrum may be allocated for uplink communications and downlink communications. The spectrums also are further divided into channels within these uplink and downlink allocations.

Communications system 100 is divided up into areas with separate signal paths in which the RF spectrum allocated for the cable telephony service may be used again for a different group of subscribers in each separate cable branch of the distribution network 106. In the downlink spectrum, a large number of conventional television channels (for example 80 channels, each 6 MHz in width) are conveyed to cable television subscribers. In the reverse, in the uplink spectrum, other communications are provided. A portion of the downlink spectrum and an equal or larger portion in the uplink spectrum are dedicated to a plurality of trunked traffic channels serving a large number of subscribers having telephone and/or other two way service. Within these dedicated spectrum allocations, a number of RF channels are deployed. These RF channels are spaced 600 KHz apart and each channel contains 8 digitally encoded time division multiplexed information bearing channels. Active channels are operated in pairs with one in the uplink segment of the allocation associated with each one in the downlink segments. This association provides for frequency division duplex (FDD) operations. In addition, communications system 100 provides for time division multiplexing in which a number of channels are derived from the transmission medium by dividing the access to the medium into sequential "time slots".

Connection and Messages

With reference now to FIG. 3, a block diagram of connection event message types is depicted according to the present invention. Table 200 is a table of connection event messages that the CCU 102 sends to TANPS 116 according to the present invention. The messages illustrated in table 200 are used in a number of different types of connections occurring in communications system 100. Registration, calls, connection tests, and code downloads are examples of connections that may occur within communications system 100.

With reference now to FIG. 4, a table of connection types and connection event messages associated with the connection types in a cable telephony system is depicted according to the present invention. Table 201 shows connection event messages for registration, calls, connection test, and code download connections. For example, in registration connections, CCU initiated registration (CCU_INIT_REG) or CAU initiated registration (CAU_INIT_REG), cable connection established (CABLE_CONN_ESTABLISHED), registration summary (REG_SUMMARY), connection released (CONN_RELEASED), and link transfer (LINK_TRANSFER) are messages sent during this type of connection. Call connections include CABLE_CONN_ESTABLISHED, CCU_CONN_ESTABLISHED, Call stable (CALL_STABLE), CONN_RELEASED, and LINK_TRANSFER messages. Connection tests include CABLE_CONNECTION_ESTABLISHED, abandoned call report (ABANDONED_CALL_REPORT), CONN_RELEASED, and LINK_TRANSFER messages, while code download connections include CABLE_CONNECTION_ESTABLISHED, download report (DOWNLOAD_REPORT), CONN_RELEASED, and LINK_TRANSFER messages. CCU 102 generates these messages in response to events occurring at the CCU and relays them to TANPS 116 for processing. The content of these messages are described in more detail below.

The messages depicted in tables 200 and 201 are intended to be illustrative of a preferred embodiment of the present invention. Other messages, in place of or in addition to those depicted, may be generated in response to events occurring with the cable telephony system.

With reference now to FIG. 5, a table of information elements that may be contained within a connection event message is depicted according to the present invention. Table 202 identifies the different types of information elements that may be contained within a connection event message, such as those listed in table 200 in FIG. 3. The connection identifier in table 202 is a unique value used to associate all activities which occur during a given connection. The sequence number information element is employed to indicate the sequence in which events occur and indicates the number of connection event messages sent for this connection. The time stamp information element indicates the time a particular event occurred. The serving area identification distinguishes service areas within the cable telephony system and provides information to determine where the message originated. The terminal identifier information element identifies the terminal involved in the communications. A CAU that can handle one call has one terminal while a CAU that can handle multiple simultaneous calls is considered to have multiple terminals, each identified by a terminal identification.

The cable carrier profile information element describes the cable carrier used by the connection and includes information describing the channel, which may include the number of time slots and the channel identification. The connection type information element specifies the type of connection, such as call, registration, testing, and downloading. The network carrier profile information element describes the connection to the local digital switch. Information concerning connections to the local digital switch is collected in addition to information concerning connections within the cable infrastructure to allow resource utilization to be calculated separately for the two types of interfaces. One interface is the interface between the CCU and the PSTN while the other interface is the interface between the CCU and the CAUs. Each interface has different amount of overhead and therefore needs to be monitored independently. The alert identifier information element specifies an alert value used by a CAU to identify when it is being alerted by the cable telephony system. The alert value is the unique identifier broadcast by the cable telephony system to the CAU and used to let the CAU know it is being alerted.

Registration type information is an element specifying the type of registration whether it is for a service or a terminal. Registration is the process by which a CAU identifies itself to the CCU, and the CCU informs the CAU of its enabled capabilities. The registration process includes service registration in which the CAU is registered and terminal registration in which each terminal or line for the CAU is registered.

Number of link transfers specifies the number of link transfers that the particular connection was involved in. A link transfer is the process of "hands-off" a connection from one frequency to a new frequency. Encryption key updated is an information element specifying whether the encryption key, which is used to encrypt data transmitted between the CCU and the CAU to provide a secure communications channel, was updated during a registration.

The link transfer status information element encodes the status of a link transfer. The status may indicate whether the link transfer was successful or whether it failed. Link transfer type is an information element encoding the type of link transfer that has occurred. Link transfer types may include for example, management link transfer or interference avoidance link transfer. A management link transfer is performed for frequency management purposes such as moving all calls off of one transceiver in a CCU and onto other transceivers operating at different frequencies to perform diagnostics on that transceiver. An interference avoidance link transfer is performed to avoid interference occurring on a carrier.

The disconnect disposition information element encodes information identifying why a connection was released. Call setup delay is an information element that reports the amount of time that occurred before the call was set up by the CCU. The dial tone delay information element reports the time from when the CAU detects an off-hook condition until the CAU receives dial-tone from the local digital switch. Abandoned call is an information element containing data on what calls were abandoned prior to gaining access to the CCU. The version number information element reports the particular release number of the software downloaded to the CAU. The download status information element encodes the status of a code download to a CAU. The download status information element may indicate whether the code download succeeded, failed, or was interrupted by a phone call. FIGS. 6–16 are tables of information elements for different types of connection event messages.

Turning now to FIG. 6 a table of information elements contained within a cable connection established (CABLE_CONN_ESTABLISHED) message is depicted according to the present invention. A cable connection established message is sent from CCU 102 to TANPS 116 to inform the TANPS 116 that CCU 102 has established a connection with the CAU. In FIG. 6, table 204 lists information elements found in cable connection event messages for indicating a network connection has been established. With reference to FIG. 7, a table of information elements contained within a network connection established message is depicted according to the present invention. A network connection established (NETWORK_CONN_ESTABLISHED) message is sent from CCU 102 to the TANPS 116 to indicate that CCU 102 has established a connection to the public switched telephone network through the local digital switch.

FIG. 8 illustrates information elements contained in a connection event message sent in response to a call reaching a stable state. Table 208 lists information elements in a call stable (CALL_STABLE) message sent from CCU 102 to the TANPS 116 indicating that a call by a CAU has reached a stable state, that is, if it has established an end-to-end voice path for this call. Information elements in a registration summary (REG_SUMMARY) message is depicted in table 210 in FIG. 9. This message is sent to the TANPS 116 to indicate that a registration has been successfully completed.

Turning next to FIG. 10, Table 212 lists information elements in a CAU initiation registration (CAU_INIT_REG) message according to the present invention. This message is sent by the CCU 102 to the TANPS 116 in response to an initiation of a registration event by a CAU.

A table of information elements in a CCU initiation registration message is shown in FIG. 11 according to the present invention. A CCU initiation registration (CCU_INIT_REG) message is sent from the CCU 102 to the TANPS 116 in response to an initiation of a registration of the CAU from the CCU.

Turning now to FIG. 12, an illustration of a table of information elements for a link transfer (LINK_TRANSFER) message is depicted according to the present invention. Table 216 illustrates information elements in a link transfer message sent from CCU 102 to the TANPS 116 in response to an occurrence of a link transfer. This message is sent for each connection utilizing a carrier on which a link transfer has occurred.

Turning now to FIG. 13, a table listing information elements for a connection released (CONN_RELEASED) message is depicted according to the present invention. A connection released message containing information elements as illustrated in table 218, is sent from CCU 102 to the TANPS 116 in response to the release of a connection. FIG. 14 illustrates a table of information elements in a connection failed (CONN_FAILED) message. Table 220 illustrates information elements included in a message sent to the TANPS 116 from CCU 102 in response to a failed attempt to set up a connection.

Turning next to FIG. 15, a table illustrating information elements in an abandoned call report message is depicted according to the present invention. Table 222 illustrates the information elements that are sent in an abandoned call report (ABANDONED_CALL_REPORT) message to the TANPS 116 from CCU 102 to inform the TANPS 116 of statistics gathered from a CAU during a connection test. A connection test is the process of establishing a connection from the CCU to the CAU and exchanging information over this connection, including the reporting to the CCU of statistics gathered by the CAU, for the purpose of verifying the operability of the CAU. With reference to FIG. 16, a table of information elements in a download report message is depicted according to the present invention. A download report (DOWNLOAD_REPORT) message is sent from CCU 102 to the TANPS 116 to indicate the completion of a code download to a CAU. Table 224 illustrates the elements that are included in a download report message sent to TANPS 116.

Processes for Generating, Gathering, and Utilizing Connection Event Messages

Figure 17:
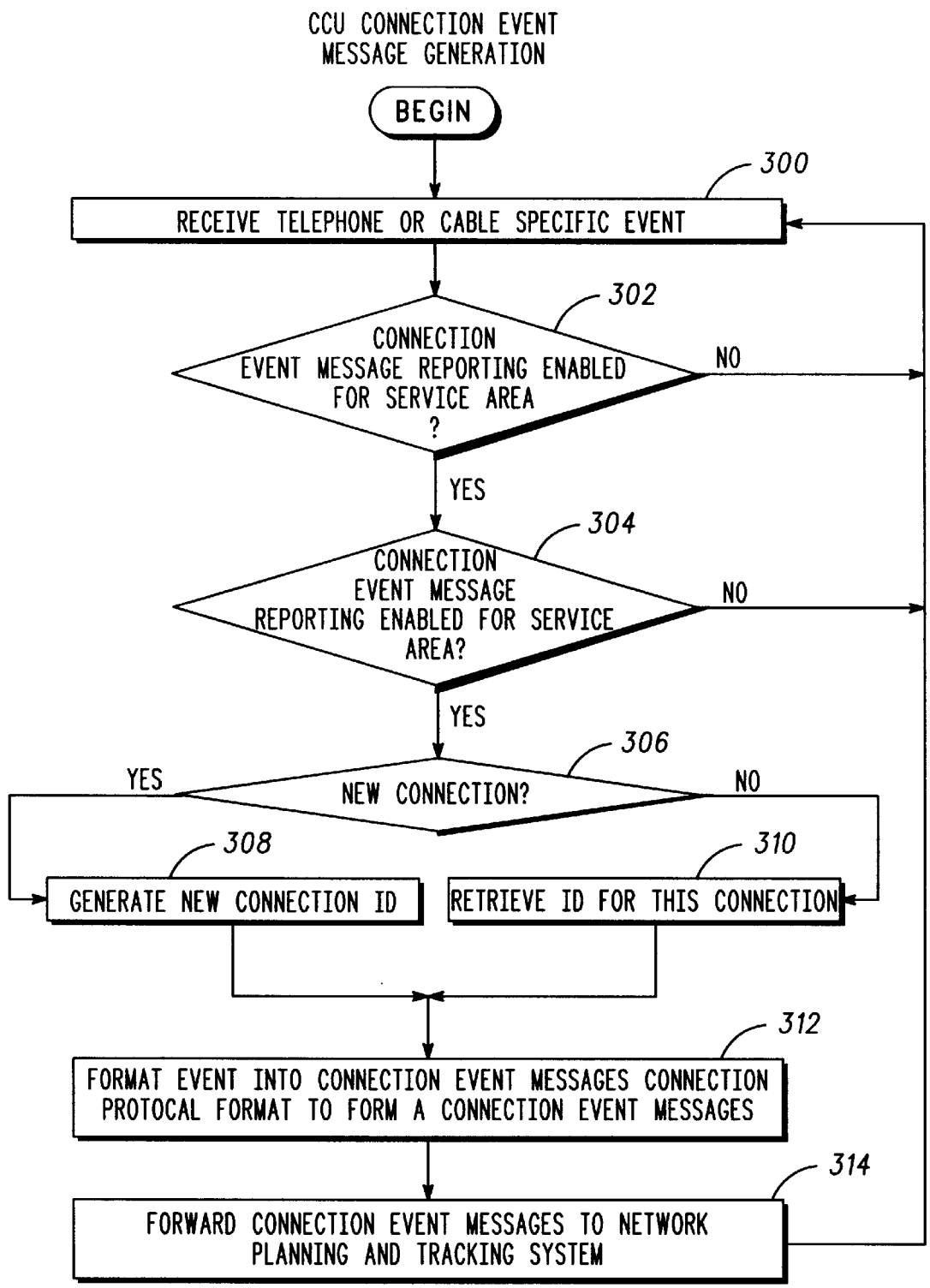
FIG. 17 depicts a flowchart of a process for generating connection event reports according to the present invention.

Turning next to FIG. 17, a flowchart of a process for generating connection event messages is depicted according to the present invention. The process begins by receiving a telephone or cable specific event (step 300). Thereafter, a determination is made as to whether connection event message reporting has been enabled for the service area (step 302). If connection event message reporting is not enabled for the service area, the process returns to step 300. Otherwise, the process determines whether connection event message reporting has been enabled for the CAU associated with the detected event in the service area (step 304). If the answer is no, the process returns to step 300. If the answer to this determination is yes, a determination is made as to whether the connection is a new connection (step 306). If the connection is a new connection, the process generates a new connection ID (step 308). Otherwise, the process retrieves the ID for the connection (step 310). In either event, the process proceeds to format the event into a connection report protocol format to form a connection event message (step 312). The connection report protocol format is a format using information elements as depicted in FIGS. 6–16. Thereafter, the connection event message is forwarded to the traffic analysis and network planning system (step 314) with the process returning to step 300 thereafter.

Figure 18:
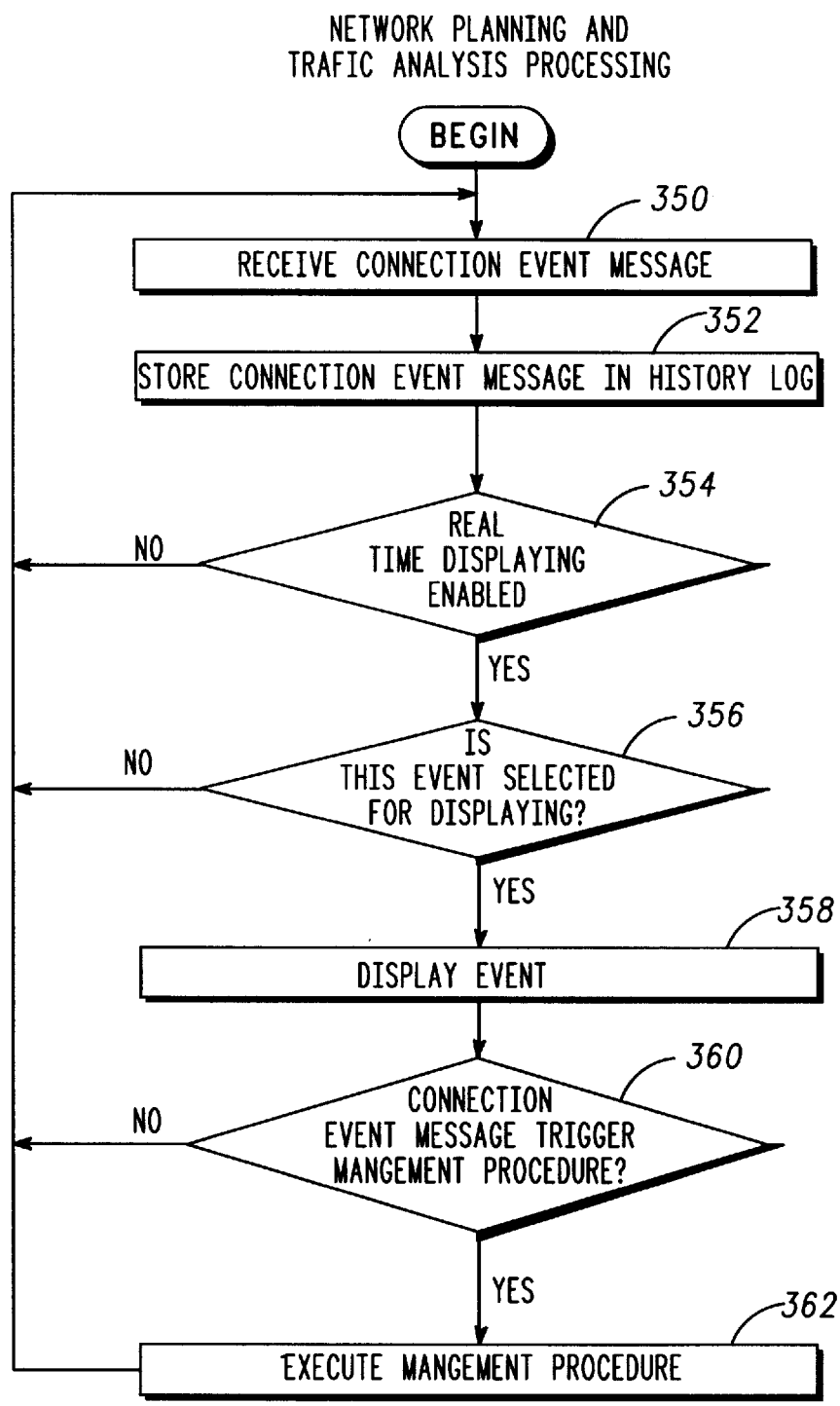
FIG. 18 depicts a flowchart of a process for processing connection event messages according to the present invention.

With reference now to FIG. 18, a flowchart of a process for processing connection event messages is depicted according to the present invention. This process occurs within TANPS 116 in the depicted example. The process begins by receiving a connection event message from the CCU (step 350). Thereafter, the process stores the connection event message in a history log (step 352). The process then determines whether real-time displaying has been enabled (step 354). If real-time displaying has been enabled, the process then determines whether the event is a type selected for displaying (step 356). If the event is of a type selected for displaying, the process displays the event (step 358) with the process then proceeds to step 360. With reference again to step 354, if real-time displaying is not enabled, the process proceeds to step 360. The process also proceeds to step 360 from step 356 if the event is not of type for displaying.

With reference again to step 350, upon receiving a connection event message, the process also determines whether the connection event message is one that triggers a management procedure (step 360). Examples of management procedures are described below in the description of FIGS. 19–24. If the connection event message is not one that triggers a management procedure, the process returns to step 350. Otherwise, the process executes a management procedure (step 362) with the process also returning to step 350. Recording connection events from messages generated by a CCU as they occur provides a basis for managing the communications system, including system debugging, system engineering and network planning. Typically, connection events are stored in a database from which reports can be generated to derive information on various aspects of system loading and performance. For example, average and peak transceiver utilization can be calculated from the number and duration of connections.

Figure 19:
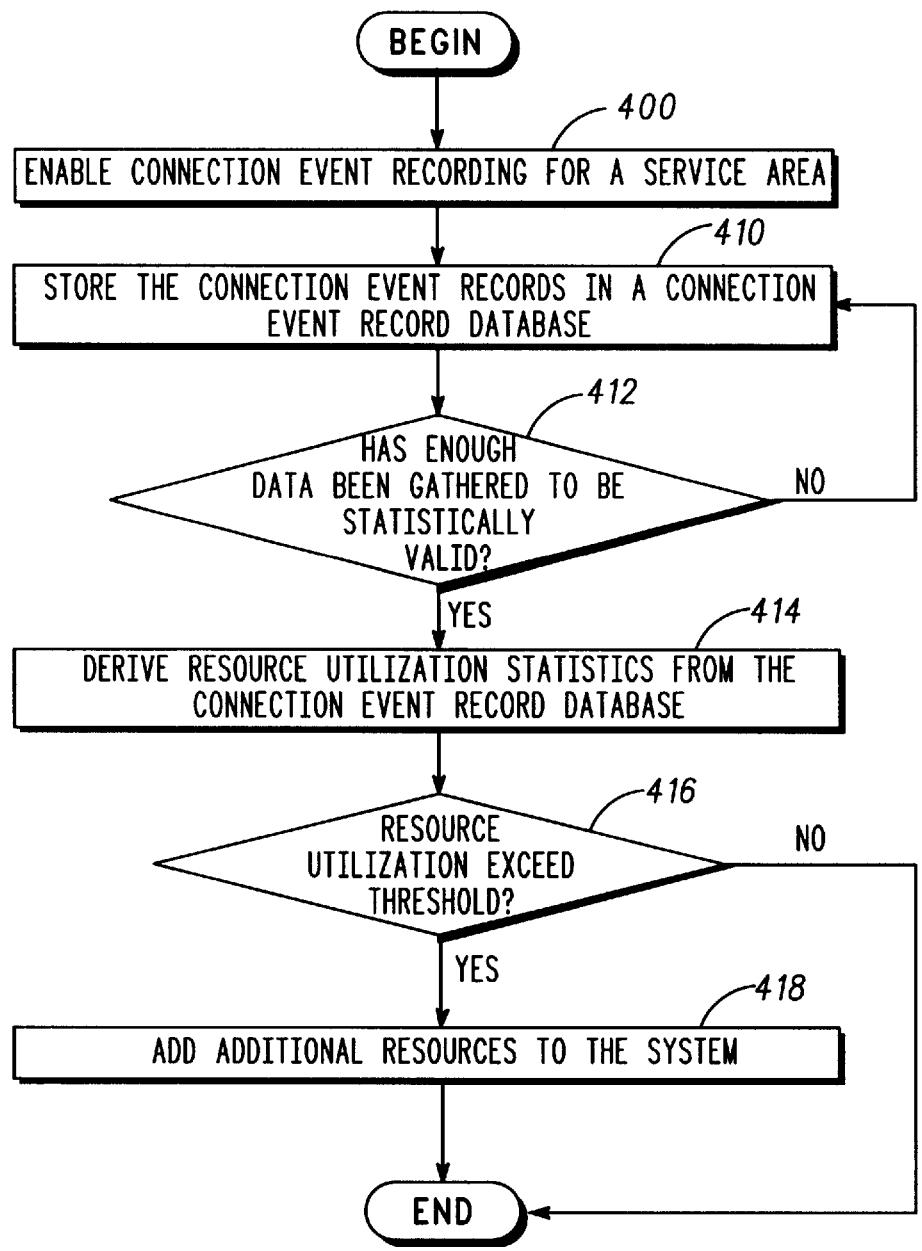
FIG. 19 illustrates a flowchart of a process for determining whether additional resources are required according to the present invention.

The following descriptions provide examples of how the "real-time" reception and logging of connection of events can be employed to manage the communications system. For example, new equipment and frequencies in a cable communications system may be required depending on utilization of system resources. According to the present invention, a deterioration of average and peak usage periods can be determined and used to identify whether additional resources are required to increase the capacity of the system. With reference now to FIG. 19, a flowchart of a process for determining whether additional resources are required is illustrated according to the present invention. The process begins by enabling connection event recording for a service area (step 400). Thereafter, the process stores connection event records generated from the CCU (step 410). The process then determines whether sufficient data has been gathered to analyze the connection event records (step 412). The amount of data that is required to be gathered before an analysis is performed may vary, depending on the type of analysis being made. In some cases, the reception of a single connection event report is enough. In other cases, hundreds of reports may be required before triggering this management process. If sufficient data has not been gathered, the process continues to store connection event records generated by the CCU in step 410. Otherwise, the process derives resource utilization statistics from the database (step 414). The resource utilization statistics may be derived using any well known statistical method.

A determination is then made as to whether resource utilization has exceeded a threshold (step 416). The threshold is set depending on the particular cable telephony system. Threshold levels are chosen at utilization levels where system performance begins to degrade. Transceiver thresholds, for example, may be set at 90% utilization during busy hour periods. If the threshold has been exceeded, the process adds additional resources to the system (step 418). If the threshold has not been exceeded, the process then terminates without adding resources to the cable telephony system. Resources may be added to the system in the form of additional storage devices, transceivers, or CCUs, which may be in place, but waiting for activation by the processes of the present invention.

Figure 20:
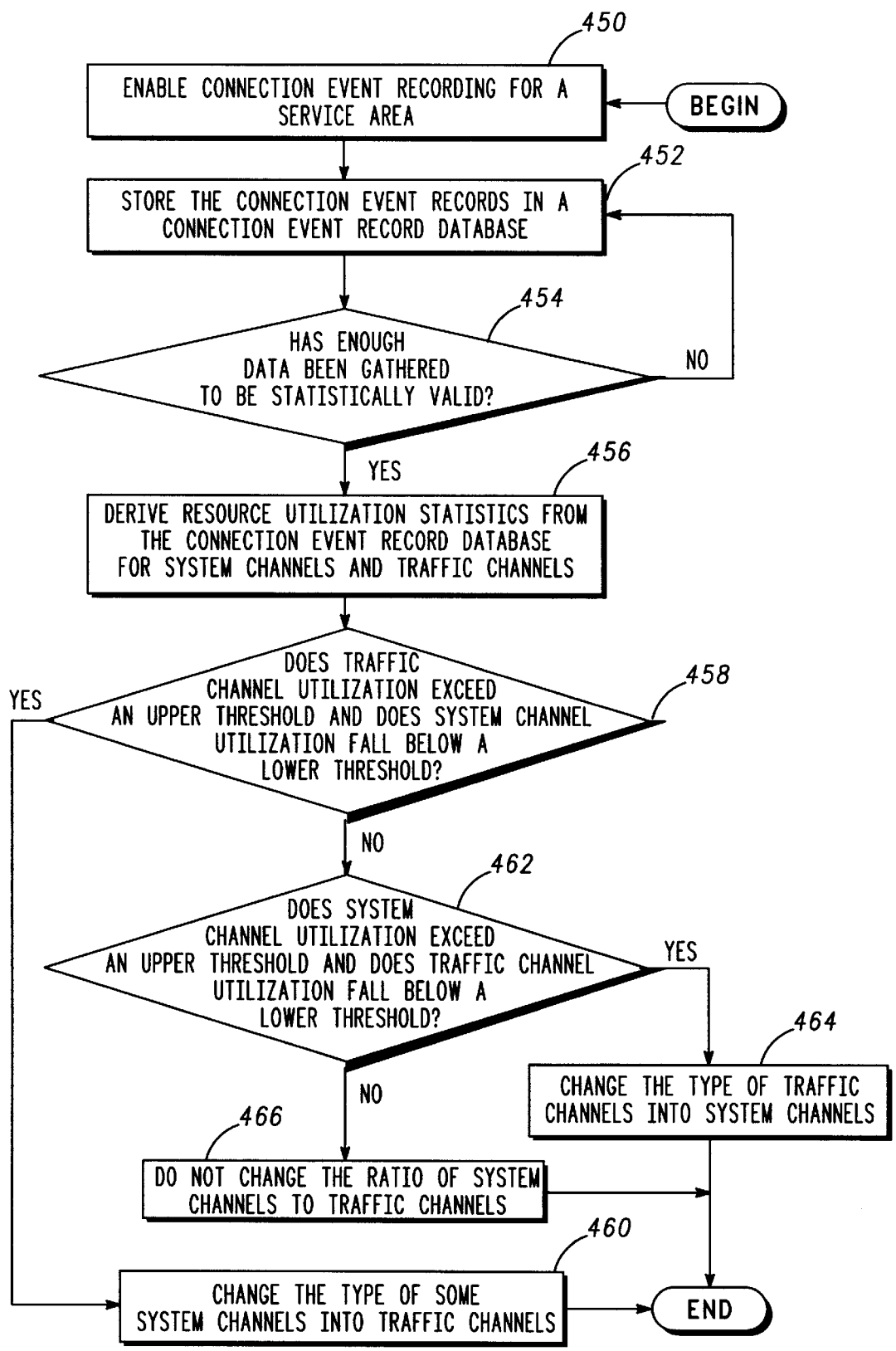
FIG. 20 illustrates a flowchart of a process for analyzing system and traffic channel utilization and balancing channels according to the present invention.

Typically, each service area includes a variety of types of channels, such as system access channels, system broadcast channels, and traffic channels, with system access channels being employed to gain access to the cable telephony system, system broadcast channels being employed to carry system configuration information and alerts from the CCU to the CAUs, and traffic channels being employed as carriers of data within the cable telephony system. Depending on how heavily system channels are used relative to traffic channels, the ratio of traffic channels to system channels may require adjustment. According to the present invention, these channels may be balanced in response to reception of connection events. Turning now to FIG. 20, a flowchart of a process for analyzing channel utilization and balancing channels is illustrated according to the present invention. The process begins by enabling connection event recording for a service area (step 450). Thereafter, connection events are stored in a database (step 452). A determination is then made as to whether enough data has been gathered to make an analysis (step 454). If not enough data has been gathered, the process then returns to step 452. If sufficient data has been gathered, the process then determines resource utilization statistics from the database for system channels and traffic channels (step 456).

A determination is then made as to whether traffic channel utilization has exceeded an upper threshold, and whether system channel utilization falls below a lower threshold (step 458). If the answer to this determination is yes, the process then reassigns some system channels as traffic channels (step 460), with the process terminating thereafter. Otherwise, the process then determines whether system channel utilization has been exceeded in upper threshold and whether traffic channel utilization has fallen below a lower threshold (step 462). If the answer to this determination is yes, the process then changes some of the traffic channels into system channels (step 464) with the process terminating thereafter. If either the upper threshold of the system channel use has not been exceeded and/or the traffic channel use does not fall below a lower threshold, the process terminates.

Another situation in which connection events are used on a real-time basis is to determine whether CAUs need to be moved between service areas to balance loading within service areas. In cases where logical service areas cover overlapping physical areas, a determination of the relative use of resources in each service area can be made. With this information, along with activity level reports on the CAUs, CAUs can be moved from one service area to another to balance the use of resources between these service areas.

Figure 21:
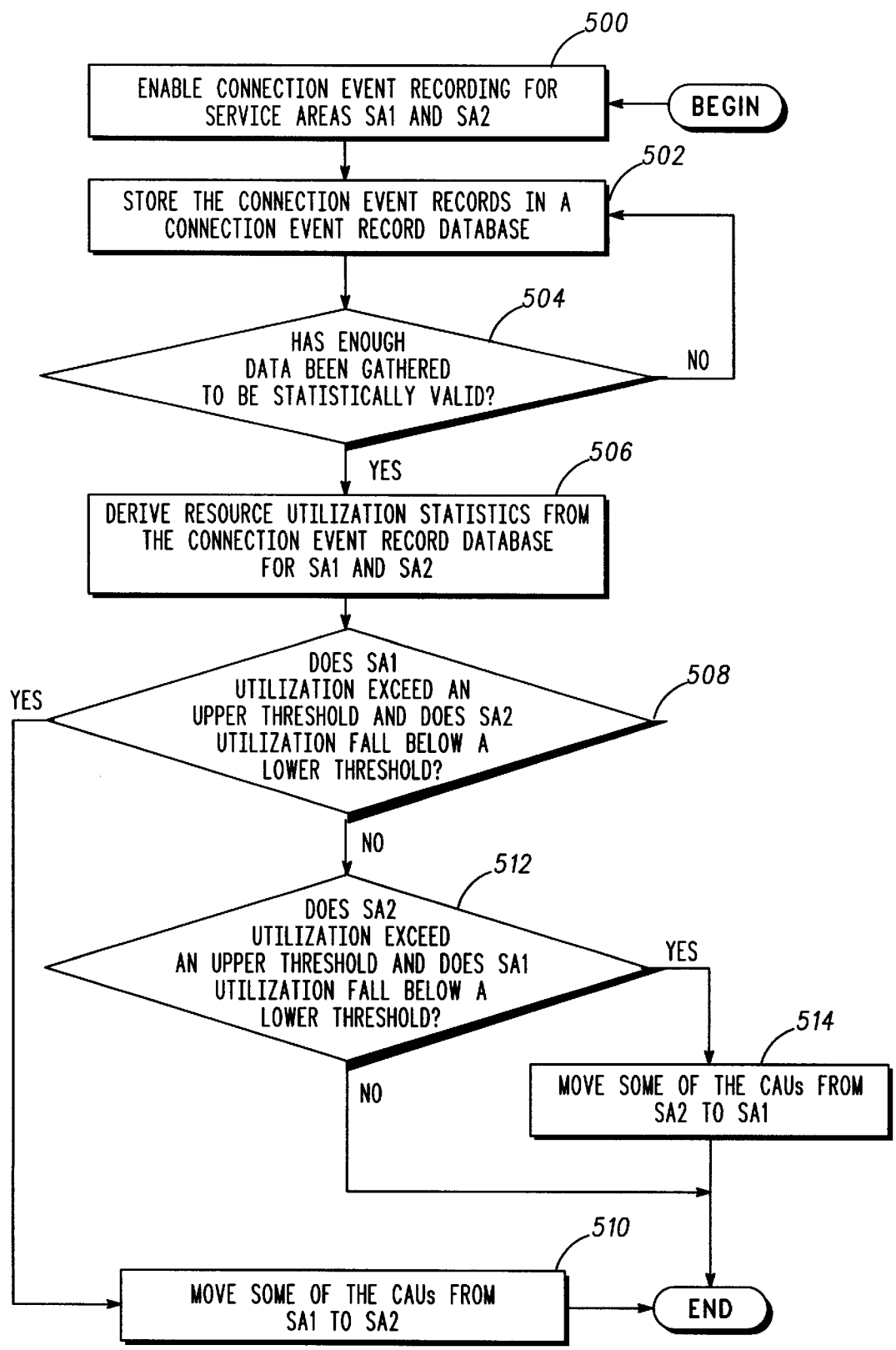
FIG. 21 illustrates a flowchart of a process for analyzing service area loading and balancing loading between service areas according to the present invention.

Turning now to FIG. 21, a flowchart of a process for analyzing service area loading and balancing loading between two service areas is illustrated according to the present invention. The process begins by enabling connection event recording for the overlapping service area (step 500). Thereafter, connection event records generated by the CCU are stored in a database (step 502). A determination is then made as to whether sufficient data has been gathered to make an analysis (step 504). If the answer is no, the process returns to step 502 to store additional connection events records. Otherwise, the process derives utilization statistics from the database for the overlapping service area (step 506). A determination is made as to whether service area one (SA1) utilization exceeds an upper threshold and whether service area two (SA2) falls below a lower threshold (step 508). If the answer to this determination is yes, the process then moves some CAUs from SA1 to SA2 (step 510) with the process terminating thereafter. Otherwise, the process determines whether SA2 utilization exceeds an upper threshold and whether SA1 utilization falls below a lower threshold (step 512). If the answer to this determination is yes, the process moves some CAUs from SA1 to SA2 (step 514). If the answer to the determination in step 512 is no, the process then terminates.

Although the depicted example in FIG. 21 analyzes loading in two service areas, the present invention may be applied to other numbers of logical service areas with physical overlaps.

The detecting of connection events on a real-time basis also allows for initiation of tests in response to a reception of particular connection event reports. For example, if a connection test fails for a given CAU, connection tests for CAUs in the same portion of the distribution network of the CAU should be initiated. A determination of whether CAUs are in the same portion of the distribution network may be made based on whether the CAUs are within a preselected distance from each other or by whether the CAUs are within the same serving area according to the present invention. A connection test occurs by sending the CAU a status request message. The results from these additional tests can be used to determine whether a CAU has failed or whether a problem exists with the cable infrastructure in the cable telephony system. Typically, connection tests may be performed periodically for all CAUs in the cable telephony system, such as every 1–24 hours. When periodic testing is disabled, the activity of CAUs can be tracked and used to initiate connection testing. For example, any CAU idled for extended period of time, such as 48–72 hours, could be automatically tested to insure that it is functional.

Figure 22:
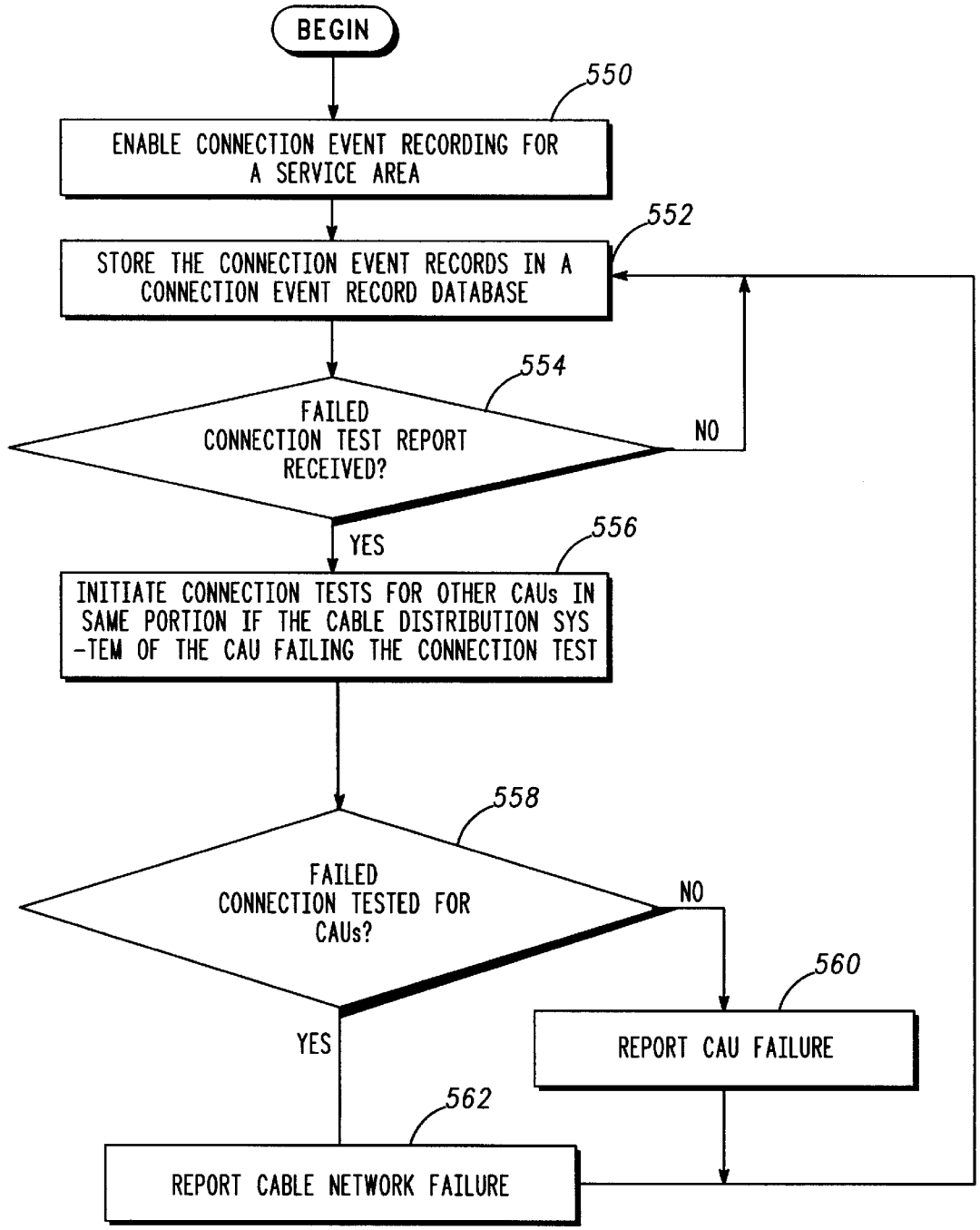
FIG. 22 illustrates a flowchart of a process for initiating connection tests and identifying failed units in infrastructure according to the present invention.

With reference now to FIG. 22, a flowchart of a process for initiating connection tests and identifying failed units in the cable telephony infrastructure is illustrated according to the present invention. The process begins by enabling connection event recording for the service area (step 550). The process then stores connection event records in a database (step 552). The process then determines whether a failed connection test report has been received (step 554). If a failed connection test report has not been received, the process returns to step 552. Otherwise, the process initiates connection tests for other CAUs in the same portion of the distribution network of the CAU failing the connection test (step 556). Determination of which CAUs fall within a same portion of the distribution network depends on the particular implementation of the system. A determination is made as to whether failed connection test reports are received for CAUs being tested (step 558). If no failed connection test reports are received, the process reports a CAU failure for the original CAU failing the connection test (step 560). Otherwise, the process reports a cable distribution network failure (step 562) with the process returning to step 552.

Figure 23:
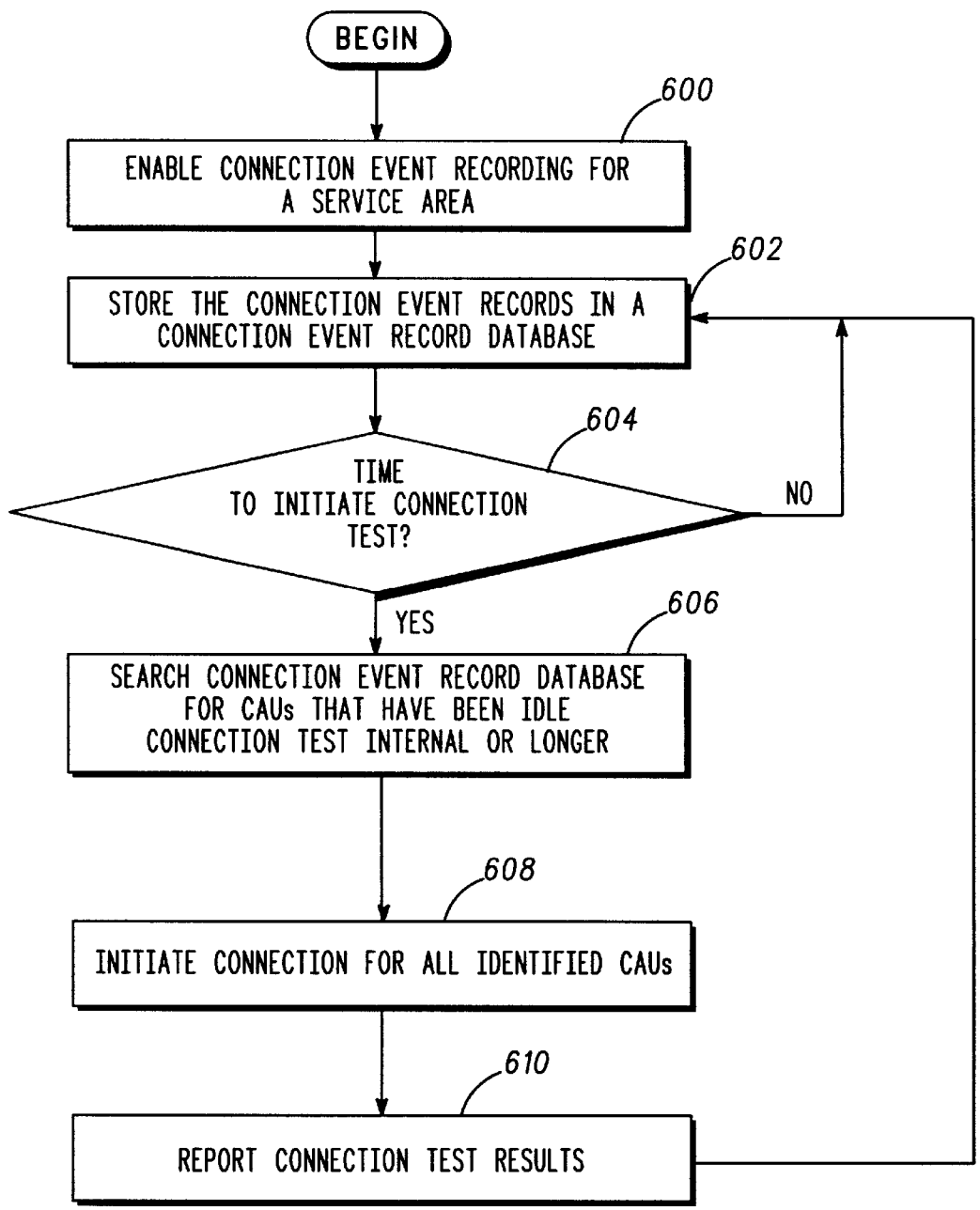
FIG. 23 depicts a flowchart for automatic initiation of connection tests according to the present invention.

With reference now to FIG. 23, a flowchart for automatic initiation of connection tests is depicted according to the present invention. The process begins by enabling connection event recording for the service area (step 600). Thereafter, connection event records are stored in a database as they are received from the CCU (step 602). The process then determines whether to initiate a connection test based on the stored event records (step 604). If it is not time to initiate the connection test, the process then returns to step 602. Otherwise, the process searches the database for CAUs that have been idle for the connection test interval or for a longer period of time (step 606). Connection tests are then initiated for all CAUs found in step 606 (step 608). Thereafter, connection test reports are received (step 610).

According to the present invention, patterns of interference also can be analyzed, based on the connection event reports, to determine whether common patterns of ingress noise occur within the communications system. If certain periods of time are identified as problematic for certain carriers, those carriers may be taken out of service during problematic times.

Figure 24:
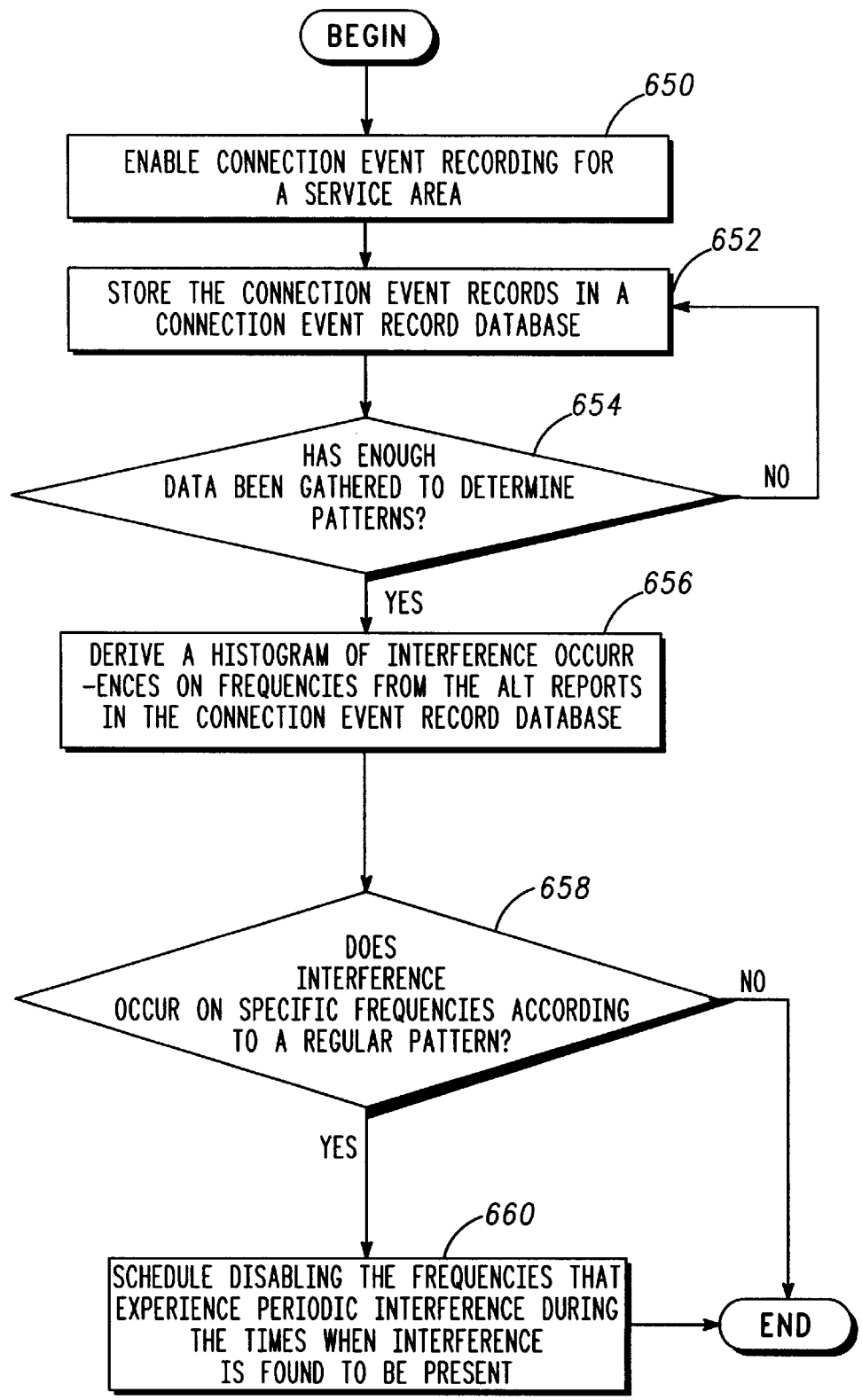
FIG. 24 illustrates a flowchart of a process for determining patterns of interference based on connection event reports according to the present invention.

Turning now to FIG. 24, a flowchart of a process for determining patterns of interference based on connection event reports is illustrated according to the present invention. The process begins by enabling connection event reporting for the service area (step 650). The process then stores connection event records in a database (step 652). A determination is then made as to whether sufficient data has been gathered to determine patterns of interference within the cable telephony system (step 654). If insufficient data has been gathered, the process returns to step 652. Otherwise, the process determines a histogram of interference occurrences on frequencies based on alternate link transfer (ALT) reports in the database (step 656). A determination is made as to whether interference occurs on specific frequencies along a regular pattern (step 658). If a regular pattern of interference does not occur, the process then terminates. If a pattern occurs for specific frequencies, the process then disables frequencies experiencing periodic interference during the times when the interference is found to be present (step 660), with the process terminating thereafter.

Figures 25, 26:
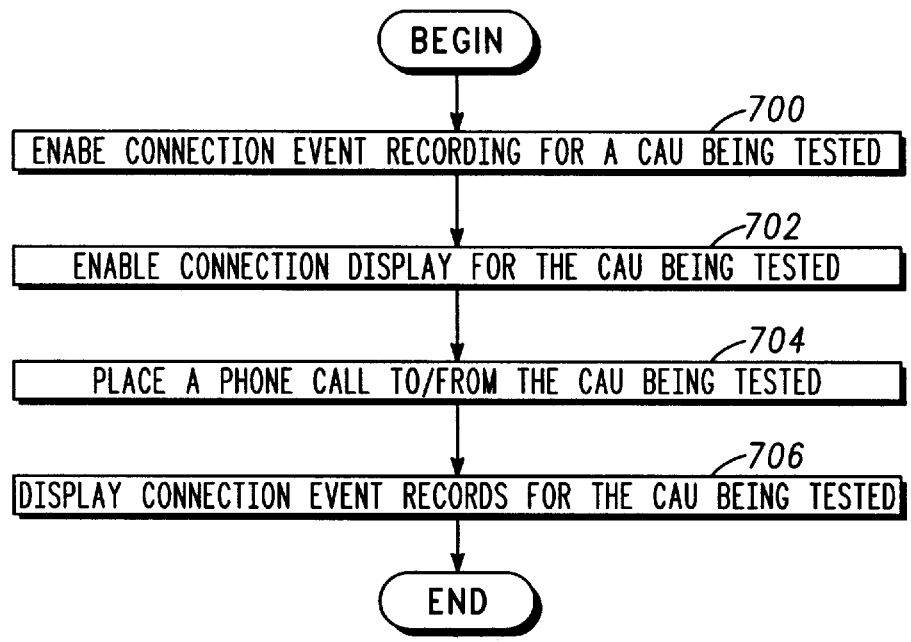
FIG. 25 depicts a flowchart of a process for providing an event trace for a CAU being tested according to the present invention.
FIG. 26 is an illustration of a display for connection failed event on a display device according to the present invention.

Real-time display also can be employed to allow an operator or technician to observe events during a connection while making a phone call, to determine the point in which a call fails. Turning now to FIG. 25, a flowchart of a process for real-time display is depicted according to the present invention. The process begins by enabling connection event recording for the CAU being tested (step 700). The process then enables a connection trace for the CAU being tested (step 702). Thereafter, a phone call is placed to or from the CAU being tested (step 704). The process then displays connection event records for the CAU being tested (step 706), with the process terminating thereafter. FIG. 26 illustrates an example of a display for a connection failed event according to the present invention. Although the depicted examples are directed towards CCUs and CAUs, the present invention may be implemented using other types of communications units.

According to the present invention, real-time system monitoring, and management is provided by real-time reporting of connection events occurring within the cable telephony system, as described above. These events, as they are detected, are reported to a data processing system for managing the cable telephony system. This type of event recording provides an ability to identify interaction between events and provides additional information for system debugging and error isolation.

In addition, the present invention provides an advantage in which processes for managing a communications system may be initiated automatically in response to receiving one or more connection event reports. Also, the display of connection events as they occur allows monitoring of calls to determine problems and points of failure in calls. Additionally, the presently claimed invention provides a method and apparatus to monitor events and manage the cable telephony system, such as, reallocating system resources or adding new system resources in response to receiving connection event reports. According to the present invention, both network and cable usage information is recorded. The present invention records events as they occur to allow quick response to events as they occur and provide information for system debugging and error isolation. The present invention records information on all connections within the system including, for example, calls, connection tests, registrations, and code downloads. Thus, the presently claimed invention allows for planning and management of a cable telephony communications system and for monitoring of call events and collating events to various problems, such as interference in the cable infrastructure, failure of CAUs, or failure within the cable infrastructure.

While the invention has been particularly shown and described with reference to a preferred embodiment, it will be understood by those skilled in the art that various changes in form and detail may be made therein without departing from the spirit and scope of the invention.

What is claimed is:

1. A method in a cable telephony system for monitoring connections within the cable telephony system, the method comprising:

detecting a plurality of events associated with connections occurring within the cable telephony system; and storing alternate link transfer events occurring within the cable telephony system as they are detected to create stored connection events, wherein the stored connection events are used to manage the cable telephony system.

2. The method of claim 1, including the step of storing call related events occurring within the cable telephony system as stored connection events.

3. The method of claim 1, including the step of storing code download occurring within the cable telephony system as stored connection events.

4. The method of claim 1, including the step of storing connection test occurring within the cable telephony system as stored connection events.

5. The method of claim 1, including the step of storing registration events occurring within the cable telephony system as stored connection events.

6. The method of claim 1, further comprises displaying the selected events within the plurality of events as they are detected, the selected events being displayed on a display device within the cable telephony system.

7. The method of claim 1, wherein the cable telephony system includes a plurality of serving areas and wherein the step of storing selected events further comprises storing events from a selected one of the plurality of serving areas.

8. The method of claim 1, wherein the cable telephony system includes a plurality of subscriber units and wherein the step of storing selected events includes storing events from at least one of the plurality of subscriber units.

9. A cable telephony system comprising:
a cable distribution network, wherein data transmissions are carried within the cable distribution network;
a plurality of subscriber units connected to the cable distribution network, wherein at least one subscriber unit within the plurality of subscriber units is associated with data transmissions within the cable telephony system;
a communications unit connected to the cable distribution network, wherein the communications unit detects detected data transmissions associated with the at least one subscriber unit within the plurality of subscriber units and automatically generates messages reporting selected ones of the detected data transmissions as the detected data transmissions are detected, wherein the communications unit initiates connection tests for selected ones of the plurality of subscriber units that have been idle for a preselected period of time, and
a data processing unit connected to the cable distribution system, wherein the data processing unit receives received messages generated by the communications unit and the cable telephony system is managed utilizing the received messages.

10. The cable telephony system of claim 9, wherein the received messages are connection event messages relating to registration events.

11. The cable telephony system of claim 9, wherein the received messages are connection test event messages.

12. The cable telephony system of claim 9, wherein the received messages are for call event messages.

13. The cable telephony system of claim 10, wherein the received messages are connection event messages for code download events.

14. A cable telephony system comprising:
a cable distribution network, wherein the cable distribution network is adapted for connection to a voice network and communications signals are transmitted within the cable distribution network;
a plurality of subscriber units connected to the cable distribution network, wherein at least one subscriber unit within the plurality of subscriber units establishes connections in the cable telephony system, wherein events are associated with each connection;
a cable communications unit, wherein the cable communications unit detects detected events occurring in response to connections established by the at least one subscriber unit and automatically generates and sends messages reporting selected ones of the detected events as the detected events are detected by the cable communications unit; and
a data processing unit connected to the cable distribution network, wherein the data processing unit receives received messages generated and sent by the cable communications unit and the cable telephony system is managed utilizing the received messages, wherein the received messages are selected from the group consisting of registration, cable connection established, network initiated registration, call stable, registration summary, cable access unit initiate registration, link transfer, connection released, connection failed, abandoned call report, and download report.

15. The cable telephony system of claim 14, wherein the received messages are employed to determine whether insufficient resources are present within the cable telephony system.

16. The cable telephony system of claim 15, wherein in response to determining that insufficient resources are present within the cable telephony system, additional resources are added to the cable telephony system.

17. The cable telephony system of claim 15, wherein in response to determining that insufficient resources are present within the cable telephony system, available resources are reallocated within the cable telephony system.

18. The cable telephony system of claim 15, wherein available resources are reallocated within the cable telephony system by moving a subscriber unit from one serving area to another serving area.

19. The cable telephony system of claim 18, wherein a plurality of channels are assigned as system channels and traffic channels and used within the cable distribution network for transmitting communications signals and wherein a reallocation of available resources is accomplished by reallocating assignment of channels between system channels and traffic channels.

20. The cable telephony system of claim 14, wherein the received messages are employed to determine whether connection tests should be initiated for a portion of the plurality of subscriber units.

21. The cable telephony system of claim 20, wherein in response to determining that connection tests should be initiated for the portion of the plurality of subscriber units, initiating connection tests for the plurality of subscriber units.

22. The cable telephony system of claim 14, wherein the communications signals are transmitted within the cable distribution network on a plurality of frequencies and wherein the data processing unit utilizes the received messages to determine a presence of a pattern of interference for a frequency within the plurality of frequencies and in response to detecting a pattern of interference for the frequency, disables the frequency when interference is expected to occur based on a determined pattern of interference.

23. The cable telephony system of claim 20, wherein a determination that connection tests should be initiated for the portion of the plurality of subscriber units results from a determination that a subscriber unit is located within a selected distance of a failing subscriber unit within the cable distribution network.

24. The cable telephony system of claim 20, wherein the data processing unit receives messages resulting from the initiation of connection tests and determines whether the subscriber unit has failed or whether a failure in the cable distribution network has occurred.

25. The cable telephony system of claim 14, wherein each of the received messages includes information elements.

26. A cable telephony system comprising:

a cable distribution network, wherein the cable distribution network is adapted for connection to a voice network and communications signals are transmitted within the cable distribution network;

a plurality of subscriber units connected to the cable distribution network, wherein at least one subscriber unit within the plurality of subscriber units establishes connections in the cable telephony system, wherein events are associated with each connection and wherein each subscriber unit within the portion of the plurality of subscriber units collects data and transmits the data to the communications unit in response to an initiation of a connection test.;

a cable communications unit, wherein the cable communications unit detects detected events occurring in response to connections established by the at least one subscriber unit and automatically generates and sends messages reporting selected ones of the detected events as the detected events are detected by the cable communications unit; and a data processing unit connected to the cable distribution network, wherein the data processing unit receives received messages generated and sent by the cable communications unit and the cable telephony system is managed utilizing the received messages, wherein the received messages are employed to determine whether connection tests should be initiated for a portion of the plurality of subscriber units results from a determination that a subscriber unit is located within a selected distance of a failing subscriber unit within the cable distribution network.

* * * * *